United States Patent
Blanchard (10) Patent No.: US 6,906,529 B2
(45) Date of Patent: Jun. 14, 2005

(54) CAPACITIVE SENSOR DEVICE WITH ELECTRICALLY CONFIGURABLE PIXELS

(75) Inventor: Richard A. Blanchard, Los Altos, CA (US)

(73) Assignee: STMicroelectronics, Inc., Carrollton, TX (US)

(*) Notice: Subject to any disclaimer, the term of this patent is extended or adjusted under 35 U.S.C. 154(b) by 190 days.

(21) Appl. No.: 10/458,644

(22) Filed: Jun. 10, 2003

(65) Prior Publication Data

US 2004/0251917 A1 Dec. 16, 2004

(51) Int. Cl.[7] .............................................. G01R 27/26
(52) U.S. Cl. ...................................................... 324/662
(58) Field of Search ................................ 324/658–690; 382/124; 340/5.53, 5.58

(56) References Cited

U.S. PATENT DOCUMENTS

| | | | |
|---|---|---|---|
| 3,387,286 A | 6/1968 | Dennard | 365/222 |
| 3,879,621 A | 4/1975 | Cavaliere | 422/3 |
| 4,297,721 A | 10/1981 | McKenny et al. | 257/49 |
| 4,958,321 A | 9/1990 | Chang | 365/185.3 |
| 6,114,862 A | 9/2000 | Tartagni | 324/662 |
| 6,525,547 B2 * | 2/2003 | Hayes | 324/662 |
| 6,636,053 B1 * | 10/2003 | Gozzini | 324/658 |

* cited by examiner

Primary Examiner—Vincent Q. Nguyen
Assistant Examiner—Amy He
(74) Attorney, Agent, or Firm—Lisa K. Jorgenson; Peter J. Thoma (57) ABSTRACT

Each pixel of an array has a subarray of upper capacitor plates located just beneath a sensing surface. The upper plates may be square and laid out in an equal number of rows and columns. Each upper plate can be selectively electrically connected to one of two lower capacitor plates according to the state of a memory cell, such as an SRAM memory cell, associated with each upper plate. The upper plate/lower plate interconnections can be configured in predetermined different patterns of the upper plates in successive sensing operations to improve the accuracy of capacitively sensing of an object, such as a human fingerprint, applied to the sensing surface above the pixel array.

20 Claims, 10 Drawing Sheets

CAPACITIVE SENSOR DEVICE WITH ELECTRICALLY CONFIGURABLE PIXELS

BACKGROUND OF THE INVENTION

The present invention relates generally to capacitive sensors, and more particularly to an improved sensor device whose principal use is as a fingerprint sensor.

Figure 1:
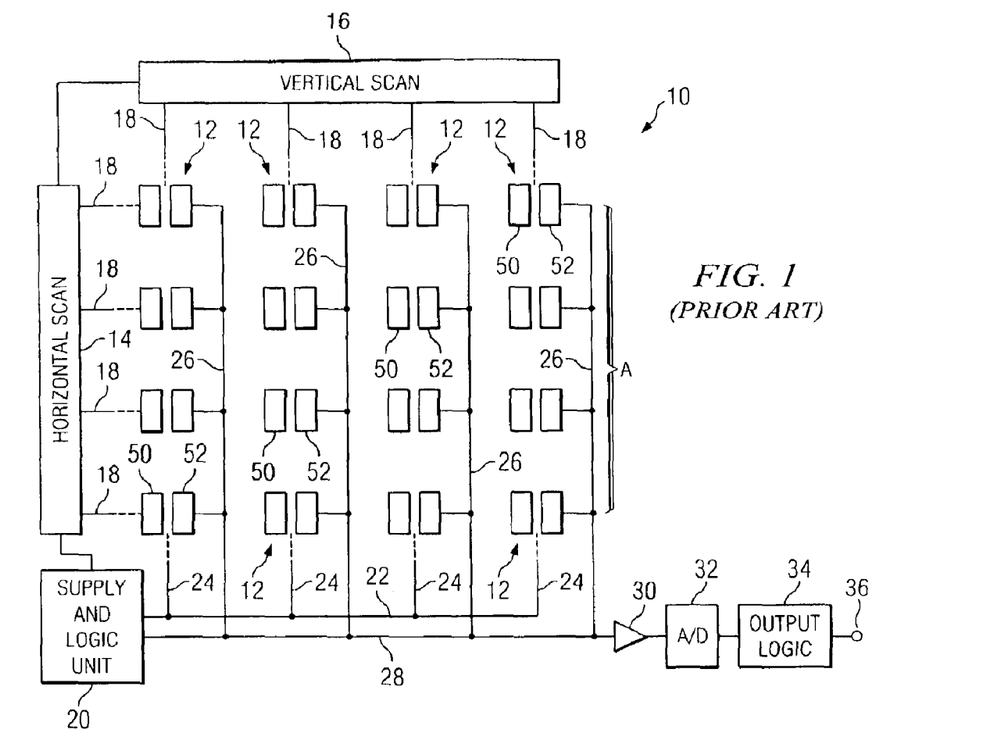
FIG. 1 is a schematic block diagram showing the layout of the principal components of a prior-art sensor device over which the present invention provides an improvement.
Figure 2:
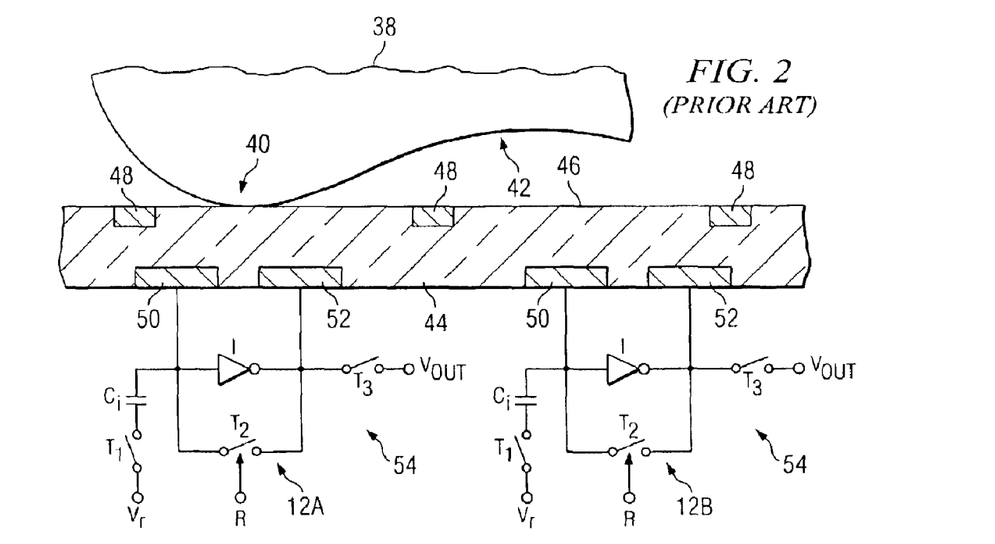
FIG. 2 is a circuit diagram shown with a schematic side view of a small portion of a human finger contacting a sensing surface of a dielectric layer, shown in cross section, and positioned above two adjacent pixels of the device of FIG. 1.

A capacitive distance sensor is disclosed in commonly assigned U.S. Pat. No. 6,114,862 by Tartagni et al., the relevant portions of the disclosure of which are incorporated herein by reference. The Tartagni patent discloses the basic structure and operation of a conventional solid-state fingerprint sensor that is formed on a single semiconductor chip. FIGS. 1 and 2 herein are simplified schematic views generally corresponding to FIGS. 1 and 4 of the Tartagni patent. The present invention provides an improvement over the structure disclosed in the Tartagni patent.

In FIG. 1 a simplified layout of sixteen sensor elements or pixels conveys the concept of the system architecture of the sensor device, which is designated generally by reference numeral 10, it being understood that many more pixels are employed in practice. For example, STMicroelectronics, Inc. manufactures and markets fingerprint sensors under the brand TouchChip®, which includes Model TCS2CF having 208×288 pixels and Model TCS1CD having 256×360 pixels.

These TouchChip® fingerprint sensors employ an active capacitive pixel-sensing technology, the fundamental aspects of which are disclosed in the Tartagni patent and conceptually reproduced herein in FIGS. 1 and 2. Each of these TouchChip® models employs an array pitch of 50 microns in which a space of 50×50 microns is allocated to each pixel providing an image resolution of 508 dots/inch (DPI) in both X and Y directions. The smaller Model TCS2CF sensor has a sensor surface size of 10.4×14.4 mm, and is designed for integration into portable electronic devices, such as laptop or notebook computers. The larger Model TCS1CD sensor has a sensor surface size of 18.0×12.8 mm, and is designed for integration into various computer and security systems that can accommodate its slightly larger size and usefully employ a larger fingerprint image.

With reference again to FIG. 1, the sensor device 10 includes sensor elements or pixels, some of which are designated by reference numeral 12, arranged in a two-dimensional array A of X rows and Y columns. As noted above in describing the TCS2CF and TCS1CD TouchChip® fingerprint sensors, typically there are more rows than columns. A horizontal scanning stage 14 and a vertical scanning stage 16 are provided for addressing one pixel 12 at a time according to a predetermined scanning sequence. Control lines 18 from the scanning stages 14 and 16 are shown partially for clarity of illustration, but will be understood to run through the array to access each of the pixels 12.

The sensor device 10 also includes a supply and logic unit 20, which supplies power to the circuit elements of the device (including the pixels 12), controls the stages 14 and 16 for sending signals to the pixels 12, and provides timing for various device operations. The unit 20 also sends a reference voltage pulse out on line 22, which is connected to lines 24 running vertically through the array A to each of the pixels 12. In a timed sequence in response to control signals from the scanning stages 14 and 16, the pixels 12 provide output signals on lines 26, which are connected to a common line 28 running from the unit 20 to a buffer 30. The buffer 30 is connected to an analog-to-digital (A/D) converter 32, which sends digital signals representing the values of the pixel output signals to output logic circuitry 34. The output logic circuitry 34 has an output terminal 36 for sending data to a system processor (not shown) for fingerprint verification or imaging depending on the particular application.

FIG. 2 schematically shows two adjacent pixels 12, which are separately designed as pixel 12A and pixel 12B. A skin surface portion 38 of a human finger is depicted over the two pixels with a fingerprint ridge 40 over pixel 12A and a fingerprint valley 42 over pixel 12B. A dielectric layer 44, which is provided atop the array of pixels, has an upper surface 46 that defines a sensing surface to which the fingerprint-bearing skin of a user's finger is applied in a sensing operation. It will be appreciated that fingerprint ridges like the ridge 40 will directly contact the sensing surface 46, and that fingerprint valleys like the valley 42 will be located just above the sensing surface 46. Preferably, a grounded surface grid 48 is provided in the dielectric layer 44 running periodically through the array between rows and columns of pixels. This feature provides a constant reference voltage at the sensing surface 46. The grounded surface grid 48 can also be connected to an electrostatic discharge (ESD) protection circuit (not shown).

Each pixel, of which pixels 12A and 12B are representative, includes first and second coplanar capacitor plates 50 and 52 embedded in the dielectric layer 44 just beneath the sensing surface 46. One possible layout of the plates 50 and 52 is shown in FIG. 1, in which each pixel 12 has rectangular shaped plates 50 and 52 arranged side by side. Connected to the plates 50 and 52 of each pixel 12A and 12B is a sensor circuit 54, which is shown as a generalize circuit block in FIG. 3. As seen in FIG. 2, each sensor circuit 54 includes an inverting amplifier I connected across the plates 50 and 52. A reference voltage pulse $V_r$ is applied through a row select switch $T_1$ and an input capacitor $C_i$ to the input of the inverting amplifier I. A reset switch $T_2$ is connected across the plates 50 and 52 of each pixel and in parallel with the inverting amplifier I. A reset signal R from the supply and logic unit 20, which may be applied through the horizontal scanning stage 14, controls the state of the reset switch $T_2$. Parasitic capacitances are present in the sensor circuit 54 but are not expressly shown. The output of each inverting amplifier I is connected to a pixel output $V_{out}$ through column select switch $T_3$.

Figure 3:
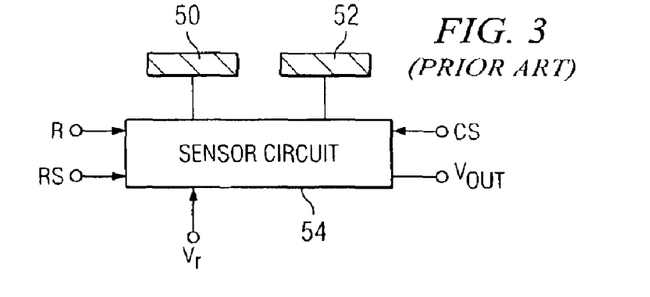
FIG. 3 is a generalized block diagram of a sensor circuit for one of the pixels of FIG. 2.

Referring collectively to FIGS. 1–3, the sensor device 10 operates as follows. With the fingerprint-bearing skin 38 of a user's finger in contact with the sensing surface 46, the supply and logic unit 20 begins sequentially addressing individual pixels 12. The reset switches $T_2$ of each pixel 12 are normally closed so that each inverting amplifier I begins a sensing operation at its logical threshold voltage. Just before each pixel 12 is addressed, its reset switch $T_2$ is opened. A row select RS signal is applied by the horizontal scanning stage 14 to each row sequentially, thus closing the row select switches $T_1$ in the selected row. A column select CS signal is also applied by the vertical scanning stage 16 to each column sequentially, thus closing the column select switches $T_3$ in the selected column. After a selected pixel 12 has been addressed in this manner, the reference voltage pulse $V_r$ is applied causing the inverting amplifier I of the selected pixel 12 to generate an output signal $V_{out}$ that is a function of the capacitance sensed by the plates 50 and 52, which varies with the proximity of the fingerprint-bearing skin 38 of the user's finger above the sensing surface 46 at the site of the selected pixel 12. Sequential addressing continues until each pixel's output $V_{out}$ has been read out, converted to a digital value by the A/D converter 32, and then transmitted to the output logic circuitry 36, which may include a memory (not shown) for storing the pixel data.

Figure 4:
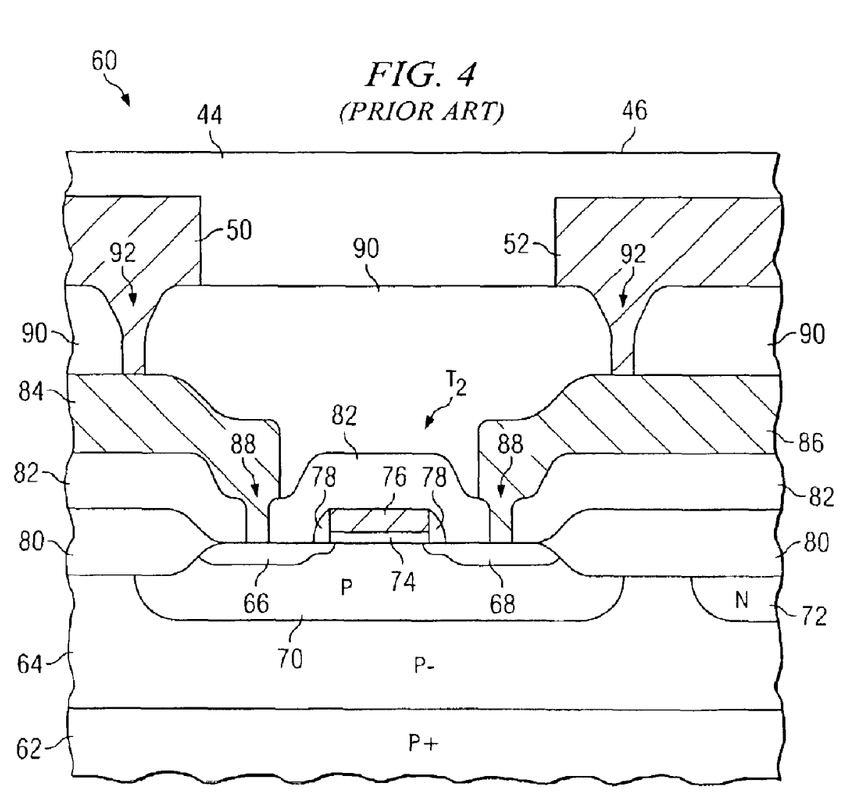
FIG. 4 is a schematic cross section of a portion of a semiconductor chip showing a transistor integrated in the structure of one of the pixels of FIG. 2, only the metal and conductive polysilicon portions being cross-hatched for clarity of illustration.

Now referring to FIG. 4, a cross-section of a portion of an integrated circuit (IC) chip 60 is shown schematically to illustrate typical structures that can be used to fabricate transistors and conductors that form the circuitry of a sensor device. The IC chip 60 can be fabricated using conventional complementary metal-oxide-semiconductor (CMOS) processing technology that permits integration of both NMOS and PMOS transistors on the same chip. FIG. 4 shows how the reset switch $T_2$ of FIG. 2 could be implemented as an NMOS transistor and connected to capacitor plates 50 and 52 located above in dielectric layer 44.

The chip 60 may be fabricated on a low resistivity P-type substrate 62, which is preferably monocrystalline silicon. Grown atop and considered to be part of the substrate 62 is an epitaxial layer 64, which is initially high resistivity P-type and is selectively doped during fabrication to form various regions that define circuit elements within the chip 60. At the upper surface of the epitaxial layer 64 are heavily doped N-type source and drain regions 66 and 68 of NMOS transistor $T_2$. The regions 66 and 68 are formed within a P well 70 that has an upper surface portion that defines the channel of transistor $T_2$, a conventional gate structure being formed thereover. A PMOS transistor (not shown) can be formed in an N well 72 partially shown at the broken-off right edge of FIG. 4. The gate structure of transistor $T_2$ includes a gate oxide layer 74, a silicided polysilicon gate 76 and oxide sidewall spacers 78. Such structures and methods for their fabrication are well known.

A composite interconnect structure of conductive and insulating layers is built up in successive steps atop the substrate 62. The composite interconnect structure includes the capacitor plates 50 and 52 imbedded in the dielectric layer 44, the gate structure of transistor $T_2$, and the layers therebetween and surrounding transistor $T_2$ that encompass all of the other circuit elements of the chip 60. A thick oxide layer 80, which is formed atop the epitaxial layer 64, has openings therein that define isolated active areas within which the regions of circuit elements, such as the source and drain regions 66 and 68 of transistor $T_2$, are formed.

A dielectric layer 82 overlies the thick oxide layer 80 and the isolated active areas defined in the openings therein, including the regions 66 and 68 of transistor $T_2$ and the gate structure therebetween. The dielectric layer 82 is preferably a doped oxide such as borophosphosilicate glass (BPSG). A first metalization layer, which preferably primarily comprises aluminum, defines conductive interconnects 84 and 86, which include contacts 88 that extend through etched openings in the dielectric layer 82 to contact the source and drain regions 66 and 68 of transistor $T_2$. Other circuit elements of the chip 60 are interconnected by portions of the first metalization layer in like manner.

A planarized dielectric layer 90 covers the metal interconnects 84 and 86 and the portion of BPSG layer 82 that overlies the gate structure of transistors $T_2$. Preferably, dielectric layer 90 is a composite of a lower undoped oxide, an intermediate spin-on-glass (SOG), and an upper undoped oxide, which are not shown separately. According to well-known processing techniques, the intermediate SOG portion of the composite dielectric layer 90 is used to planarize the structure.

The process continues by etching via openings through the dielectric layer 90 down to the conductive interconnects therebelow, and then performing a second metalization deposition of aluminum, which is patterned to form the plates 50 and 52 and includes metal vias 92 that connect the plates to the underlying conductive interconnects 84 and 86. Then, the dielectric layer 44 is formed, preferably by successive deposition steps that produce a composite multilayer structure that includes a hydrogen silesquioxane (HSG) portion between the plates 50 and 52, a thin intermediate portion of phosphosilicate glass (PSG) atop the HSQ and the plates 50 and 52, a second intermediate portion of silicon nitride atop the PSG, and an outer portion of silicon carbide atop the silicon nitride. These multilayer portions of dielectric layer 44 are not separately delineated in FIG. 4, but techniques for their fabrication are well known. It will be appreciated by those skilled in the art that the outer portion of silicon carbide provides a hard, scratch-resistant sensing surface 46.

The layout chosen for the plates 50 and 52 affects the sensitivity of the pixels. This fact is recognized by the Tartagni patent, which discloses in FIGS. 8–12 several different plate patterns as alternatives to two side-by-side rectangular plates. The various different plate patterns disclosed by the Tartagni patent have different sensitivities, which is a function of both the direct capacitance and fringing capacitance of the particular plate pattern. The direct capacitance of each plate is a function of its area and its proximity to the object being sensed. The fringing capacitance of two side-by-side plates is a function of the total perimeter length of adjacent faces or edges of the plates and their proximity to the object being sensed. The total feedback capacitance experienced by the inverting amplifier I is a function of the direct capacitances between the plates and the object being sensed, and of the fringing capacitance, which is modulated by the object being sensed.

The present invention provides an improved sensor device that can be fabricated using conventional CMOS processing techniques similar to those described above. Regardless of the particular plate pattern chosen, whether it is one of the five specific patterns shown in FIGS. 8–12 of U.S. Pat. No. 6,114,862 or a further variation thereof, each pixel output has an accuracy that depends to an extent on the particular plate pattern. However, it will be appreciated that the particular plate pattern is a permanent feature of a sensor device constructed according to the teachings of the Tartagni patent. The present invention recognizes and addresses this problem.

SUMMARY OF THE INVENTION

A sensor device structured according to the present invention has capacitor plates at each pixel location in an array of pixels, the plates being electrically configurable to assume various different patterns so that multiple sensing operations can be performed using different plate patterns to provide multiple capacitance readings for each pixel. The multiple capacitance readings are combined using a suitable algorithm to produce data representing a more accurate capacitance measurement for each pixel, enabling the capturing of a more accurate representation of the object being sensed, such as a human fingerprint.

The electrically configurable plates at each pixel location can be implemented in a subarray beneath a sensing surface. Each plate of each subarray can be selectively electrically connected to either one of two lower plates that define the capacitance that is sensed at each pixel during one sensing operation in a sequence of multiple sensing operations. The subarray plates at each pixel location can assume various different patterns according to their connection to one or the other of the two lower plates. The connection of each subarray plate to a lower plate can be effected by a memory cell dedicated to each subarray plate, the memory cell storing a logic zero or a logic one and driving one of two transistor switches ON according to the stored logic state to effect the connection.

The novel features believed to be characteristic of the invention are set forth in the appended claims. The nature of the invention, however, as well as its features and advantages, may be understood more fully upon consideration of the following illustrative embodiments, when read in conjunction with the accompanying drawings, wherein:

DETAILED DESCRIPTION OF THE INVENTION

Figure 5:
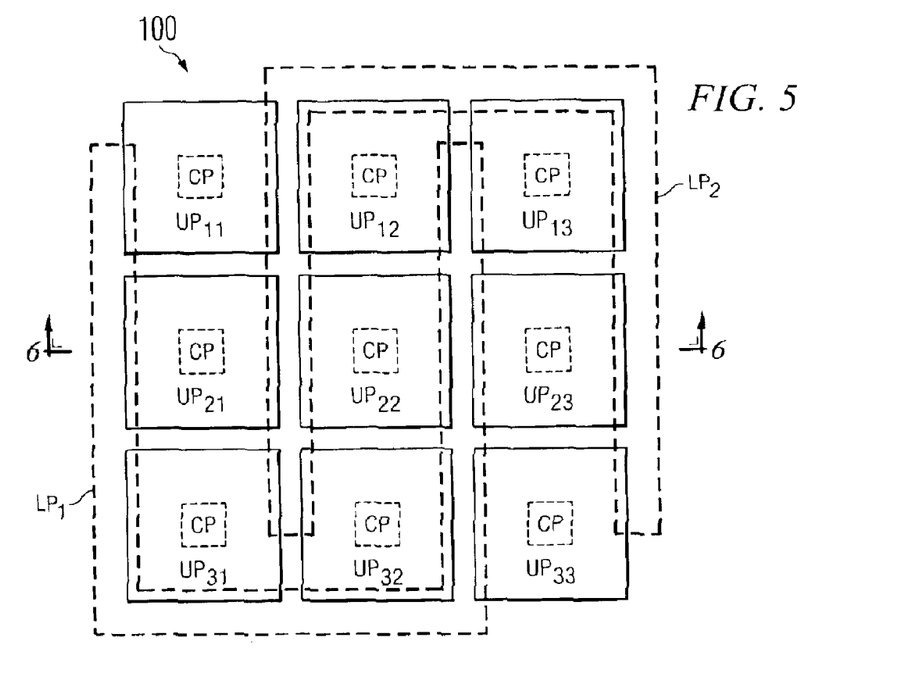
FIG. 5 is a schematic plan view of a subarray of capacitor plates according to one embodiment of the invention.
Figure 6:
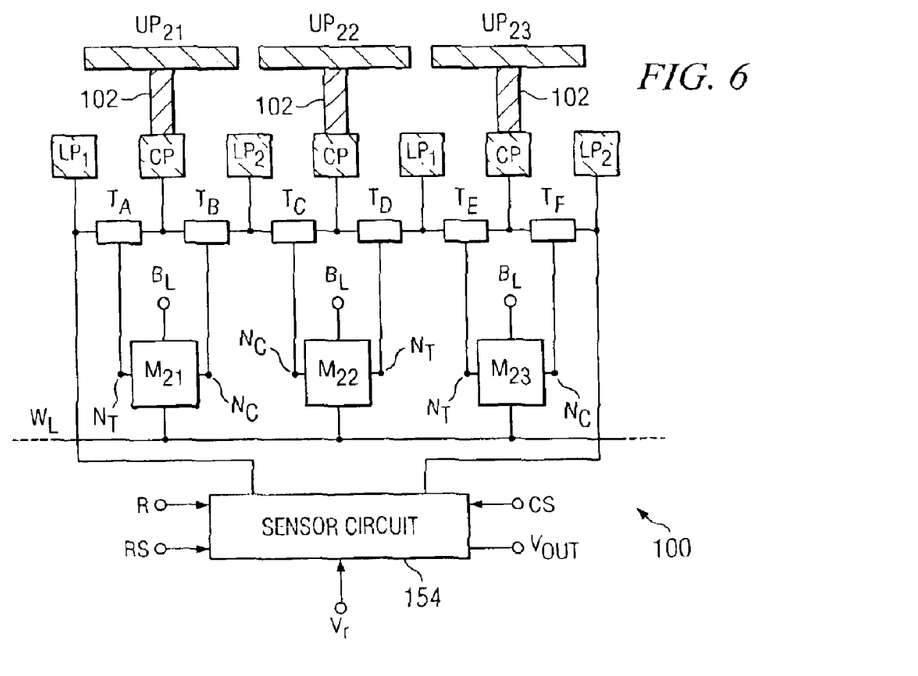
FIG. 6 is a circuit diagram shown with a schematic cross section of a row of subarray plates taken along line 6—6 of FIG. 5.
Figure 10:
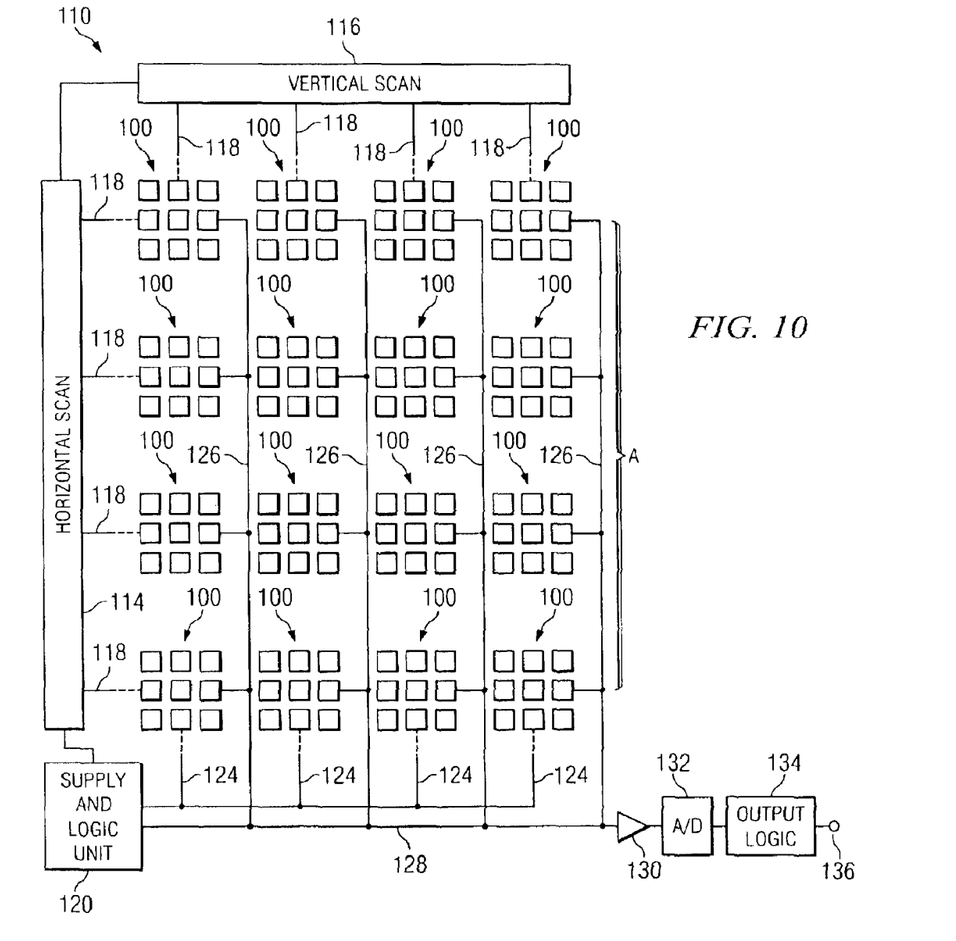
FIG. 10 is a schematic block diagram similar to FIG. 1, but instead showing subarrays of plates at each pixel location according to one embodiment of the invention.

Referring to FIGS. 5, 6, and 10, a sensor device 110 according to the present invention will now be described. FIGS. 5 and 6 illustrate only one pixel 100 of the inventive sensor device 110, it being understood that many additional identical pixels are laid out in a two-dimensional array, such as the array A depicted in FIG. 10. FIG. 10 is similar to FIG. 1, similar parts bearing similar reference numerals. Scanning stages 114 and 116, under the control of supply and logic unit 120, control the operation of the pixel array through lines 118 running through the array. Reference voltage pulses are applied on lines 124 to sensor circuits within the array, and sensed capacitance values are read out on lines 126 and inputted to buffer 130 on line 128. The buffer 130 is connected to A/D converter 132, which converts the sensed capacitance values to digital data, which are stored in output logic circuitry 134 and can be output on terminal 136 for further processing.

Instead of the two side-by-side rectangular plates for each pixel 12 of FIG. 1, a subarray of plates arranged in rows and columns is provided for each pixel 100 of the sensor device 110 of FIG. 10. In the example shown in FIG. 10, each subarray has three rows and three columns of plates, providing nine total plates per subarray, which is one of various different subarray layouts contemplated by the invention. It is preferred for simplicity, but not necessary, that each subarray be organized in straight-line rows and columns of equal number. Other organizations and pixel shapes are possible and within the broader concept of the invention. Also, FIG. 10 shows only four rows and four columns of pixels 100 to convey the concept of the basic system architecture, though there will be many more rows and columns of pixels in reality. In practice, when employed in a fingerprint sensor, the array of pixels of the inventive device may be arranged in a rectangular array of X rows and Y columns, such as the 208×288 or 256×360 pixel arrays of the above-mentioned TouchChip® fingerprint sensors of the prior art.

The preferred pixel 100 of FIG. 5 includes a subarray of upper capacitor plates in which nine upper plates UP are arranged in three rows and three columns. Each plate preferably has a square layout, but may be rectangular or have a more complex shape consistent with the inventive concept. The upper plates are individually labeled $UP_{11}$ through $UP_{33}$ in which the subscripts designate the row and column of the subarray for the particular upper plate. Two lower plates $LP_1$ and $LP_2$ are provided for each pixel 100, which are shown in dashed outline in FIG. 5 and in cross section in FIG. 6. It will be appreciated from FIG. 5 that each lower plate $LP_1$ and $LP_2$ overlaps at least one edge of each of the nine upper plates $UP_{11}$ through $UP_{33}$. A common plate CP corresponding to each upper plate UP is centered beneath its upper plate, as shown in dashed outline in FIG. 5 and in cross section in FIG. 6. A via 102 extends down from each upper plate to connect it to its underlying common plate CP, as seen with respect to upper plates $UP_{21}$, $UP_{22}$, and $UP_{23}$ in FIG. 6.

Shown in block diagram form in FIG. 6 are the circuit elements that characterize each pixel 100 and their interconnections with each other, the lower plates LP and common plates CP. Such circuit elements are used to configure the upper plates UP during a sensing operation, and include memory cells $M_{21}$, $M_{22}$, and $M_{23}$, and transistor switches $T_A$, $T_B$, $T_C$, $T_D$, $T_E$, and $T_F$, connected in the manner shown. These transistor switches preferably are implemented as NMOS transistors, and will be considered to be such in the description that follows. Each memory cell functions as a selectively configurable latch.

It will be appreciated from considering FIGS. 5 and 6 together that the top row of upper plates $UP_{11}$, $UP_{12}$, and $UP_{13}$ and the bottom row of upper plates $UP_{31}$, $UP_{32}$, and $UP_{33}$ shown in FIG. 5 each has a similar arrangement of lower plates, common plates, memory cells, and transistor switches as is shown in FIG. 6. The circuit elements include a single sensor circuit 154 for each pixel 100. The sensor circuit 154 is preferably essentially identical to the prior-art sensor circuit 54 described above, except that the sensor circuit 154 is connected across the first lower plate $LP_1$ and the second lower plate $LP_2$ of the pixel 100.

Each memory cell corresponding to each upper plate UP stores a logic zero or a logic one during a sensing operation, the stored bits corresponding to a predetermined interconnection pattern of the upper plates UP with one or the other of the lower plates $LP_1$ or $LP_2$. As shown in FIG. 6, each memory cell has a true data node $N_T$, a complementary data node $N_C$, a connection to a word line $W_L$, and a connection to a bit line $B_L$. Memory cell $M_{21}$ has its data nodes connected to transistors $T_A$ and $T_B$, memory cell $M_{22}$ has its data nodes connected to transistors $T_C$ and $T_D$, and memory cell $M_{23}$ has its data nodes connected to transistors $T_E$ and $T_F$.

Referring to FIGS. 7A through 7F, various selected patterns for the interconnection of the upper plates UP of FIG. 5 are depicted by the shaded and unshaded squares representing the upper plates of a 3×3 subarray. Let it be assumed that all of the unshaded plates represent a first set in which each plate has been electrically connected to the first lower plate $LP_1$, and that all of the shaded plates represent a second set in which each plate has been electrically connected to the second lower plate $LP_2$.

Figure 7A:
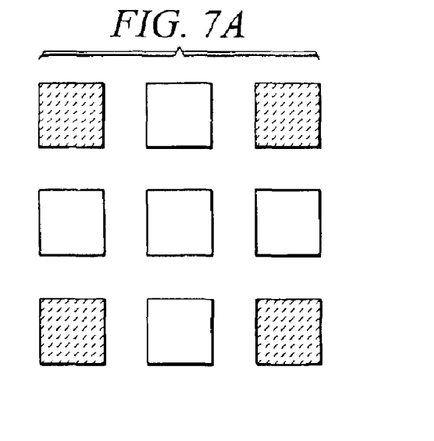
FIGS. 7A–F are schematic plan views of subarrays of plates configured in selected different three-by-three patterns according to one embodiment of the invention.
Figure 7B:
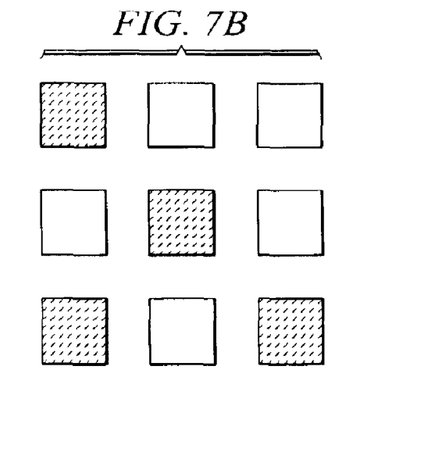
Figure 7C:
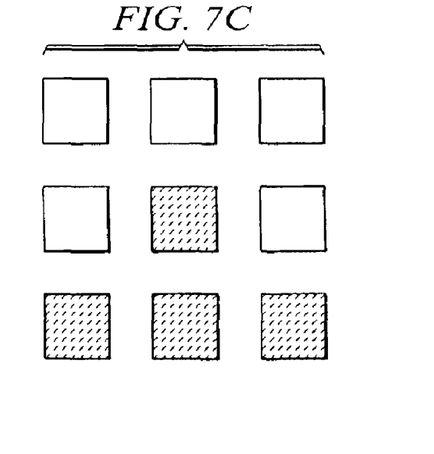
Figure 7D:
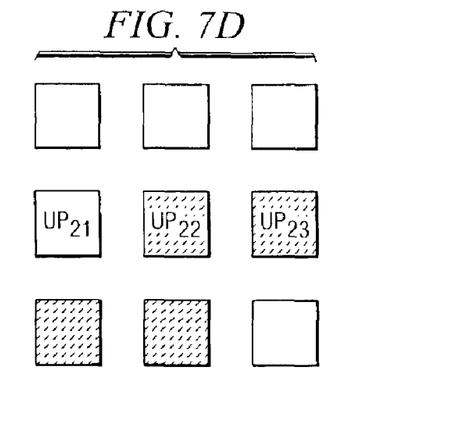
Figure 7E:
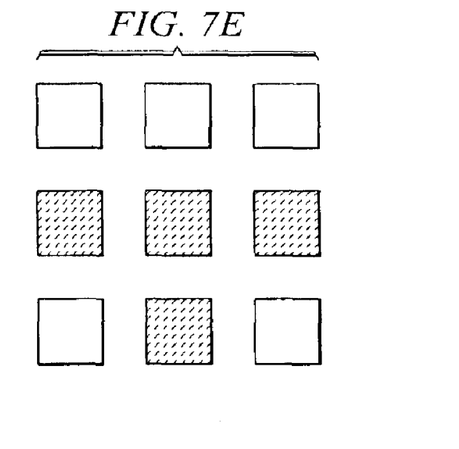
Figure 7F:
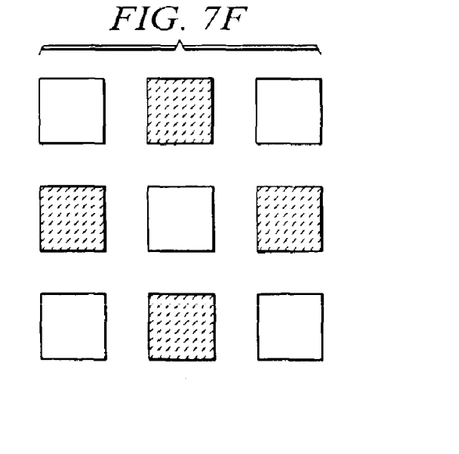

By way of example, considering the middle row of FIG. 7D and comparing it to FIG. 6, we can determine the logic states of the memory cells $M_{21}$, $M_{22}$, and $M_{23}$ and the ON/OFF states of the transistors $T_A$, $T_B$, $T_C$, $T_D$, $T_E$, and $T_F$ for effecting the electrical connections in FIG. 6 for the condition indicated by the middle row of FIG. 7D. Specifically, memory cell $M_{21}$ must be storing a logic one, and memory cells $M_{22}$ and $M_{23}$ must each be storing a logic zero. Therefore, the true data node $N_T$ of memory cell $M_{21}$, and the complementary data nodes $N_C$ of memory cells $M_{22}$ and $M_{23}$ will each be at a high logic-level voltage, thus turning ON transistors $T_A$, $T_C$, and $T_F$. Accordingly, transistor $T_A$ electrically connects upper plate $UP_{21}$ to the first lower plate $LP_1$, transistor $T_C$ electrically connects upper plate $UP_{22}$ to the second lower plate $LP_2$, and transistor $T_F$ electrically connects upper plate $UP_{23}$ to the second lower plate $LP_2$. It will also be appreciated that the complementary data node $N_C$ of memory cell $M_{21}$ and the true data nodes $N_T$ of memory cells $M_{22}$ and $M_{23}$ will each be at a low logic-level voltage, thus holding transistors $T_B$, $T_D$, and $T_E$ OFF, thereby preventing electrical connection of the upper plates to the lower plates through those transistors under the stated condition. A similar determination can be made for each of the rows in each of the patterns shown in FIGS. 7A through 7F, each pattern having a different set of shaded plates and a different set of unshaded plates, with corresponding connections being made to the lower plates of the pixel.

By varying the electrical interconnections between the upper plates UP and the lower plates LP of the subarray of pixel 100, a sequence of different capacitance readings can be made for each pixel 100 of the sensor device 110 of the present invention. FIG. 10 shows the basic system architecture of the inventive device 110, which is similar to the basic system architecture of the prior-art device 10 depicted in FIG. 1. However, rather than having a two-plate per pixel structure, each pixel 100 of the inventive device 110 has a subarray of upper capacitor plates, each of which can be dynamically electrically interconnected with one of two lower capacitor plates.

Moreover, the circuit elements for each pixel 100 are more complex in the inventive device 110, which also includes a memory cell driving a pair of transistor switches for each upper plate of the subarray, as shown in FIG. 6. This additional circuitry will require corresponding modifications to the basic system architecture. In particular, the modified horizontal and vertical scanning stages 114 and 116 include circuitry for driving the word lines and bit lines for addressing and reading in data bits to the memory cells to set up the upper plate/lower plate interconnection patterns before each sensing operation. The modified supply and logic unit 120 must additionally provide power to the memory cells in the pixel subarrays, and will include logic circuitry for setting up the various subarray patterns (shown by way of example in FIGS. 7A through 7F). Also, the unit 120 will require additional circuitry for timing the sequence of memory cell patterning cycles and consecutive sensing operations. Preferably, the output logic circuitry 134 is used to store capacitance measurement data, which will include data for at least several consecutive sensing operations.

For example, if 3×3 subarrays are used and the six patterns shown in FIGS. 7A through 7F are set up consecutively, then the data memory in the output logic circuitry 134 must be able to store six sets of capacitance measurement data for the entire pixel array, which could have 256×360 pixels for a modified version of a Model TCS1CD TouchChip® fingerprint sensor. The modified output logic circuitry 134 could also be programmed to algorithmically combine the several different sets of capacitance measurement data into a single set of pixel values for the entire array. In its most simple form, an algorithm could generate an average capacitance value from the several stored values for each pixel. More complex statistical algorithms could be used. The modified output logic circuitry 134 could thus read out the algorithmically combined values to a system processor, which can then perform a fingerprint verification operation or fingerprint imaging operation with a higher degree of accuracy.

Referring again to FIGS. 7A through 7F, another aspect of the invention will be described. In order to reduce the number of memory cell write operations between sensing operations for faster fingerprint data acquisition, less than all of the memory cells can have their logic states changed between sensing operations while still achieving significantly different upper plate/lower plate interconnection patterns in each successive sensing operation. It will be seen that in moving from the pattern of FIG. 7A to the pattern of FIG. 7B, only the upper right square and the middle-row center square in the subarray pattern have been changed. Similarly, in moving from the pattern of FIG. 7B to that of FIG. 7C, only the upper left and lower center squares have changed. From FIG. 7C to FIG. 7D, only the right center and lower-right corner squares have changed. From FIG. 7D to FIG. 7E, only the left center and lower-left corner squares have changed. From FIG. 7E to FIG. 7F, only the middle center and upper center squares have changed. Therefore, if one chose to use the successive patterns of FIGS. 7A through 7F in six successive sensing operations, after the first sensing operation, only two memory cell write operations per pixel need to be performed between sensing operations. Note that preferably each pixel stores the same subarray pattern in each sensing operation so that entire rows of the array, or even groups of rows, can be written into simultaneously, depending on the power of the bit-line driving circuitry. Note also that randomly generated subarray patterns could be used as an alternative to predetermined patterns, by including circuitry on the chip for random bit generation. It is believed, however, that using predetermined subarray patterns will achieve more consistently accurate results. Such predetermined subarray patterns can be stored on chip in a read-only memory (ROM).

Now referring to FIGS. 8A through 8F, various patterns are shown using an alternative subarray size of sixteen upper capacitor plates arranged in four rows and four columns. Each upper capacitor plate can be selectively electrically connected to either one of two lower capacitor plates using the same basic technique described in connection with FIG. 6. That is, each upper capacitor plate has an underlying common plate and a memory cell for driving ON one of two transistors to effect the interconnection. The two lower plates can be laid out interdigitally between adjacent columns. FIGS. 8A through 8F show such a layout for lower plate $LP_1$ and lower plate $LP_2$. Other layouts are possible.

Once again, as noted above in connection with the 3×3 subarray patterns, it may be advantageous to change less than all of the upper plate/lower plate interconnections in the 4×4 subarrays in successive sensing operations. In moving sequentially through the patterns shown by the shaded and unshaded upper plates in FIGS. 8A through 8F, only four of sixteen such interconnections are made at each stage. For example, in moving from FIG. 8A to FIG. 8B, only the upper plates in the row second from the top have their interconnection with the lower plates $LP_1$ and $LP_2$ changed. It will be understood that the unshaded upper plates are each electrically connected to the first lower plate $LP_1$, and that the shaded upper plates are each electrically connected to the second lower plate $LP_2$.

Figure 9A:
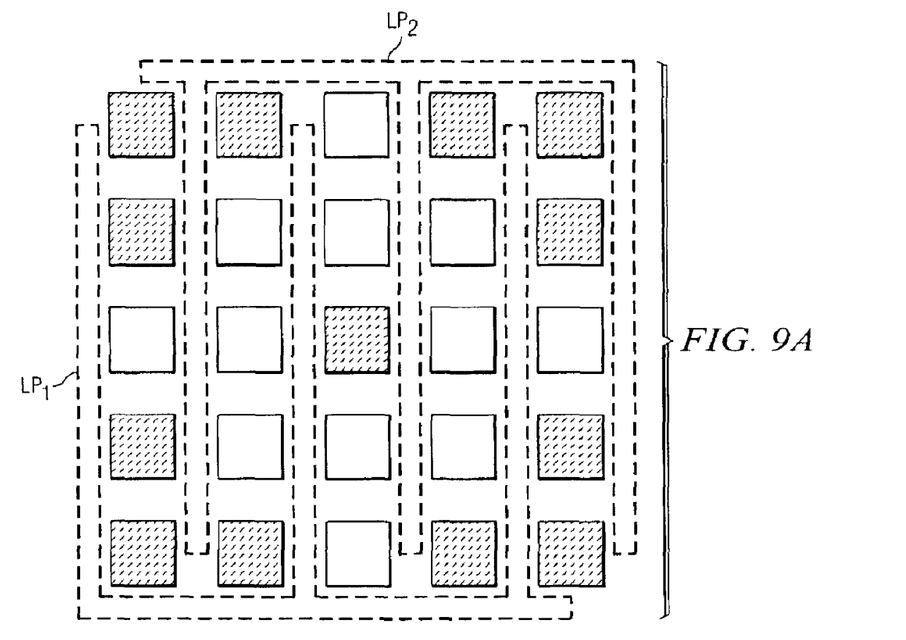
FIGS. 9A–C are schematic plan views of subarrays of plates configured in selected five-by-five patterns according to another embodiment of the invention.
Figure 9B:
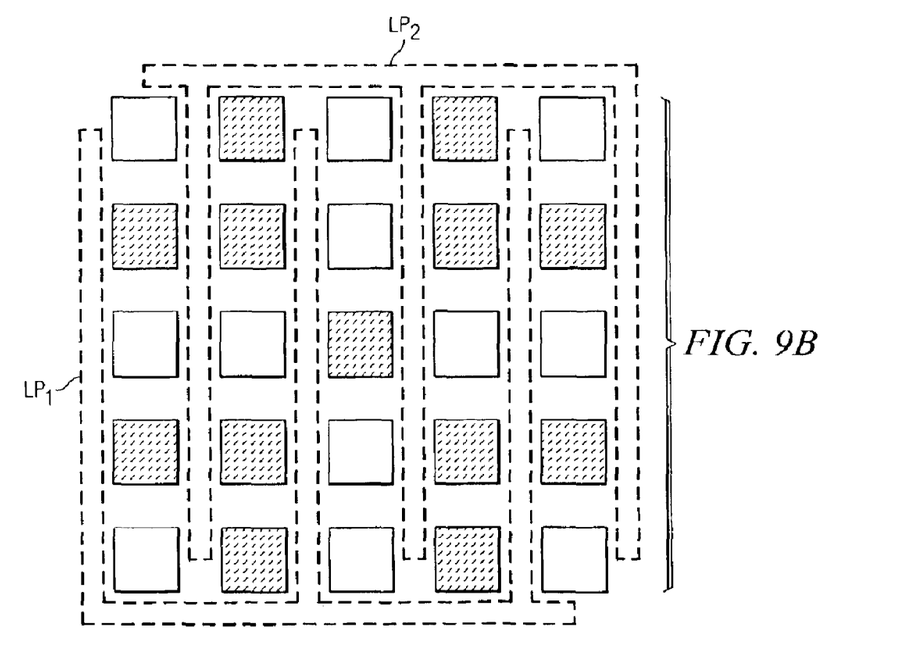
Figure 9C:
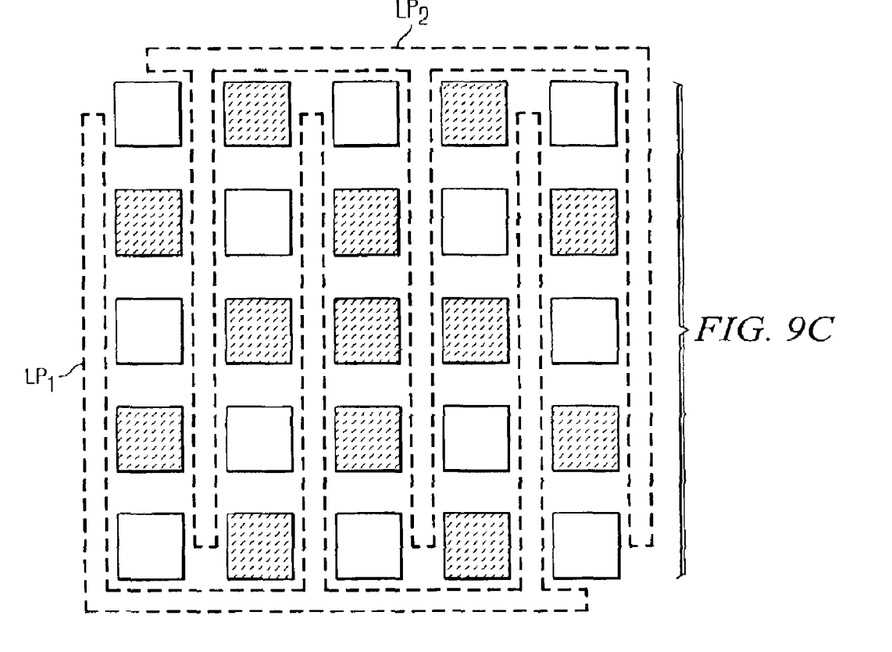

Now referring to FIGS. 9A through 9C, various upper plate/lower plate interconnection patterns are shown using an alternative subarray size of twenty-five upper capacitor plates arranged in five rows and five columns. Each upper capacitor plate can be selectively electrically connected to either one of two lower capacitor plates using the same basic technique as described in connection with FIG. 6. FIGS. 9A through 9C show one possible interdigitated layout for the lower capacitor plates $LP_1$ and $LP_2$. It will also be appreciated that only eight memory cell logic state changes are made in going from the shaded/unshaded pattern of FIG. 9A to that of FIG. 9B, and from that of FIG. 9B to that of FIG. 9C, with an advantageous minimization of memory write cycles while achieving significant pattern variation in successive sensing operations.

Figure 8A:
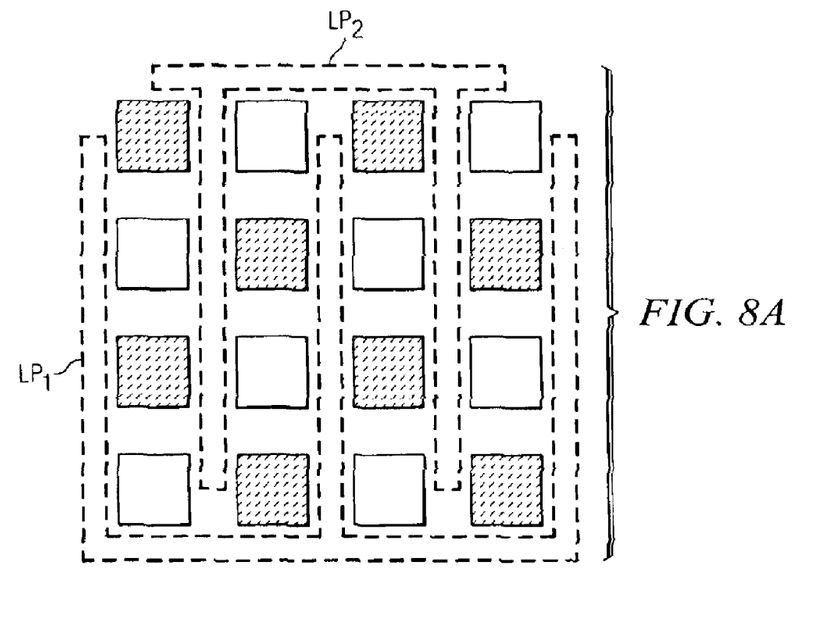
FIGS. 8A–F are schematic plan views of subarrays of plates configured in selected four-by-four patterns according to another embodiment of the invention.
Figure 8B:
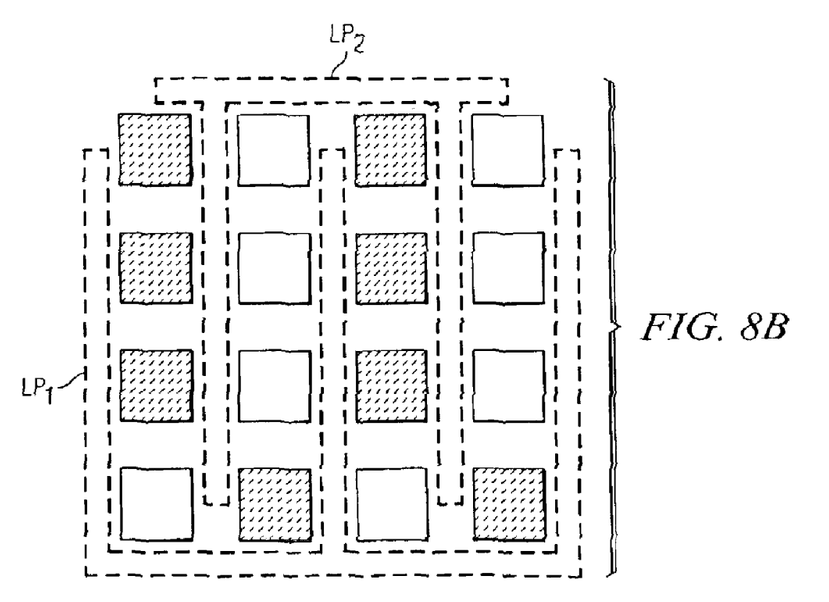
Figure 8C:
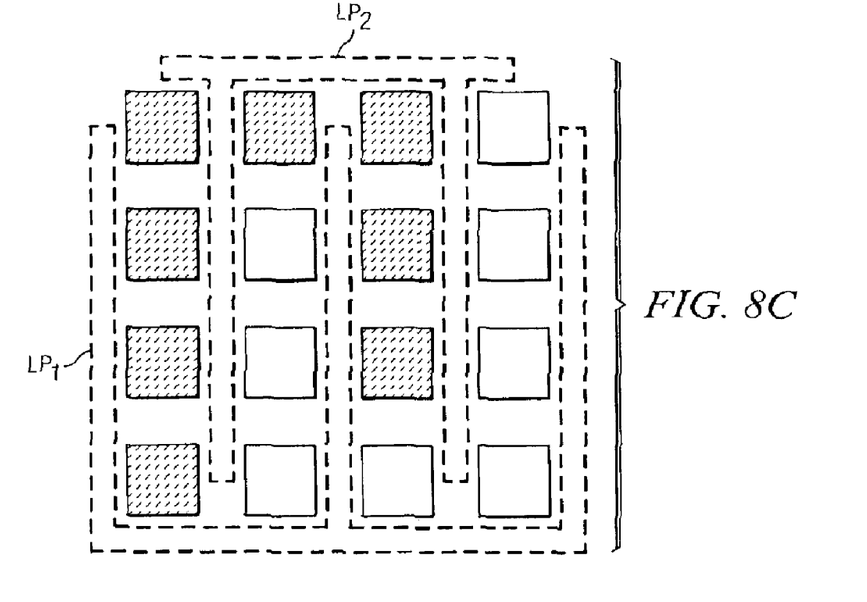
Figure 8D:
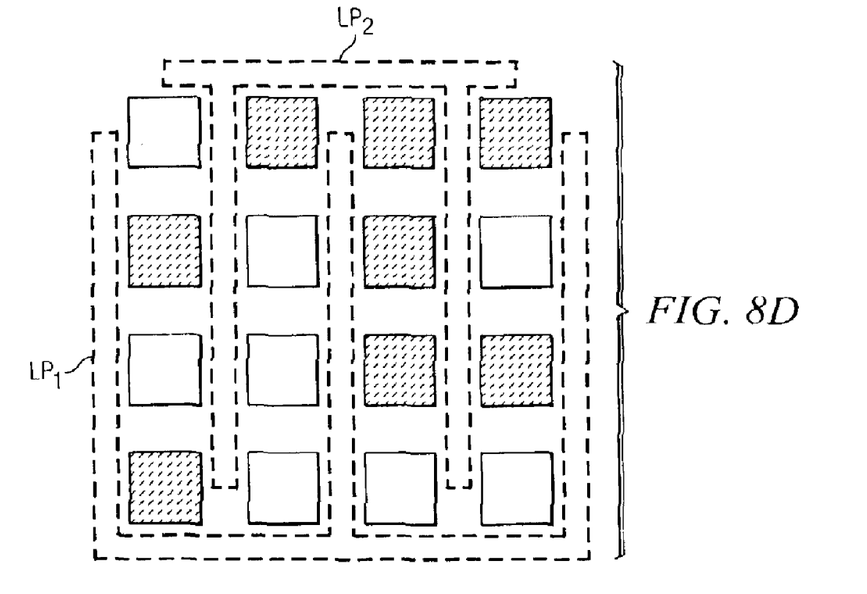
Figure 8E:
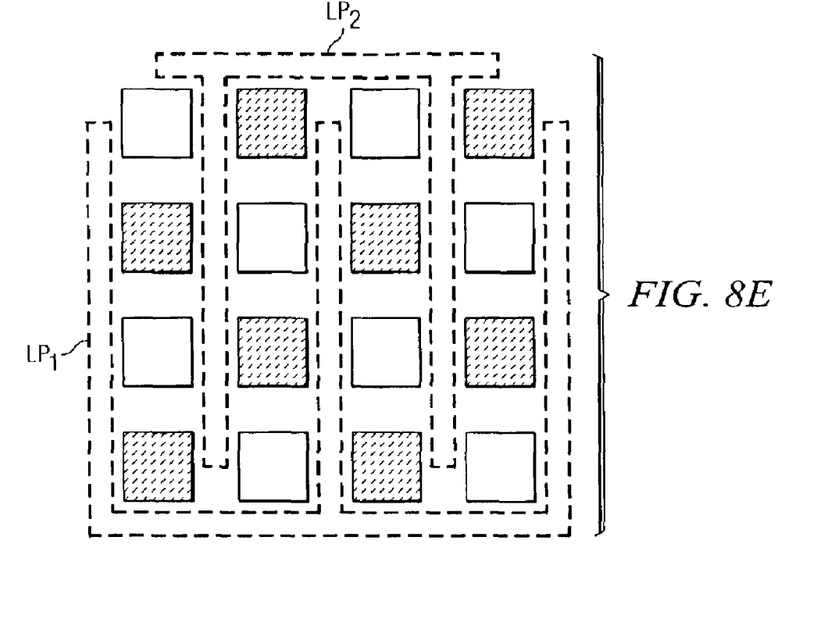
Figure 8F:
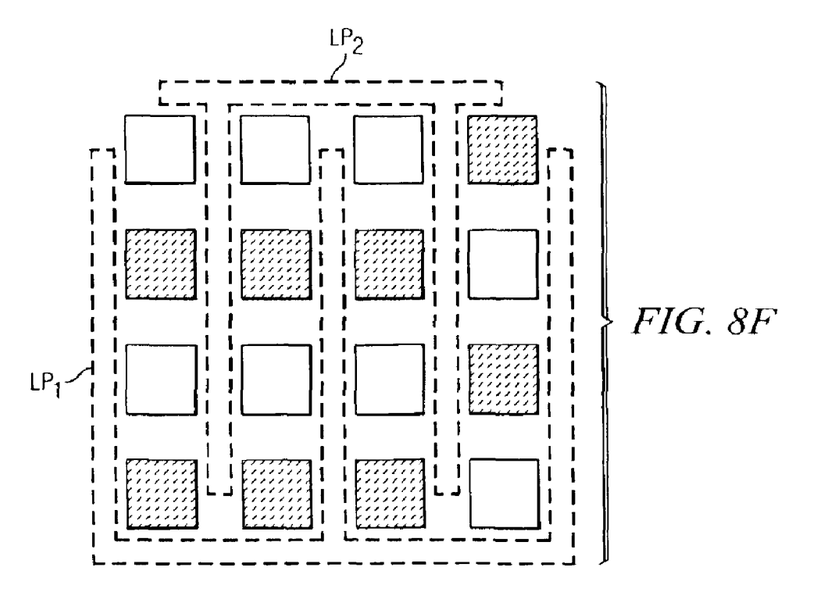

It will be appreciated that the 3×3 subarrays shown in FIG. 10 can be replaced by 4×4 subarrays of upper plates with interdigitated lower plates $LP_1$ and $LP_2$ as shown in FIG. 8A, or the 3×3 subarrays can be replaced by 5×5 subarrays as shown in FIG. 9A. Even larger numbers of plates in larger subarrays could be implemented in the basic system architecture of FIG. 10. If the size of each pixel, 50×50 microns as an example, is kept constant, then increasing the number of subarray plates will require each plate to be made smaller. However, if the pixel size is permitted to increase and fewer pixels are used in the device, the subarray plate size can be kept constant as the number of subarray plates is increased. It is contemplated that an optimum design can be arrived at with a minimum of experimentation.

Referring again to FIG. 6, the memory cells $M_{21}$, $M_{22}$, and $M_{23}$, each with their true and complementary data nodes $N_T$ and $N_C$, can be conveniently implemented using a static random access memory cell or SRAM cell, which is a well-known type of memory cell. Such SRAM memory cells are often implemented using six transistors, as shown by way of example in FIG. 1 of U.S. Pat. No. 3,879,621 by Cavaliere et al. However, since it is not necessary to read data from the memory cells used in the subarrays of the inventive device 110, a simplified version of the SRAM memory cell disclosed in the Cavaliere patent can be employed, as will now be described.

Figure 11:
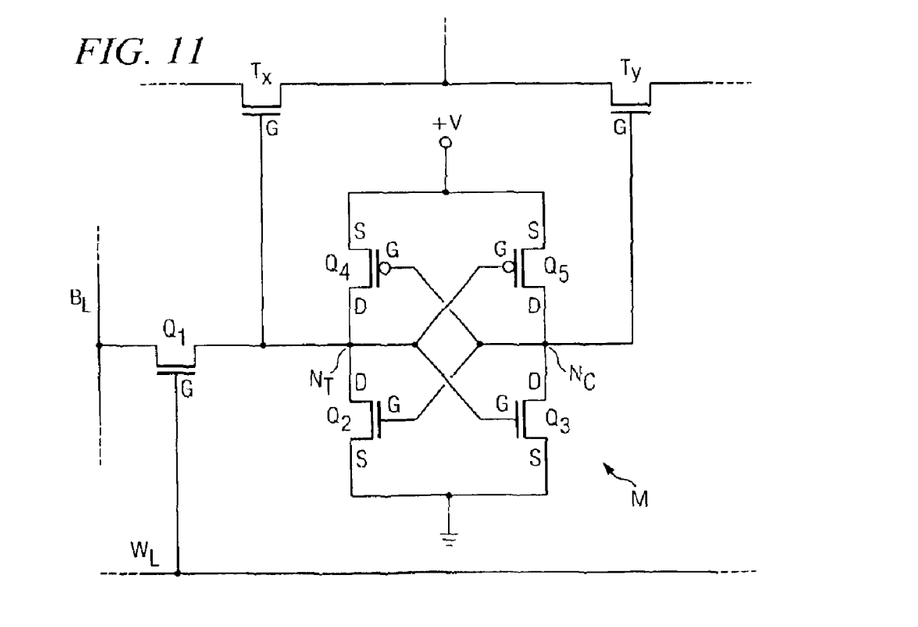
FIG. 11 is a circuit diagram of an SRAM memory cell that can be employed in configuring the subarray plates of the inventive sensor device.

Referring to FIG. 11, a five-transistor SRAM memory cell M is shown with NMOS transistors $Q_1$, $Q_2$, and $Q_3$, and PMOS transistors $Q_4$ and $Q_5$. The memory cell M has a true data node $N_T$ a complementary data node $N_C$. Those skilled in the art will recognize that transistors $Q_2$ and $Q_4$ form one CMOS inverter, and that transistors $Q_3$ and $Q_4$ form a second CMOS inverter, each with their transistor drains D connected in common at one of the data nodes. The sources S of PMOS transistors $Q_4$ and $Q_5$ are connected to a high logic-level voltage, such as a positive supply voltage designated as +V. The sources S of NMOS transistors $Q_2$ and $Q_3$ are connected to a low logic-level voltage, such as ground supply voltage designated by the conventional ground symbol. The gates G of transistors $Q_2$ and $Q_4$ are connected together and to the complimentary data node $N_C$. The gates G of transistors $Q_3$ and $Q_5$ are connected together and to the true data node $N_T$. Those skilled in the art will recognize that the two cross-connected inverters latch a high logic-level voltage on one of the two data nodes and a low logic-level voltage on the other data node. The data nodes $N_T$ and $N_C$ drive the gates G of transistors $T_X$ and $T_Y$, which correspond to the pairs of transistors $T_A$ and $T_B$, or $T_C$ and $T_D$, or $T_E$ and $T_F$, shown in FIG. 6.

In order to set the logic state of the memory cell M, or change its state, access to a bit line $B_L$ is provided by NMOS transistor $Q_1$, which can be turned ON by applying a high logic-level signal to its gate G through a word line $W_L$. When transistor $Q_1$ has been selectively turned ON, a voltage applied to the bit line $B_L$ drives the true data node $N_T$ to a corresponding logic level. For example, to write a logic zero into the memory cell M, the bit line $B_L$ is connected to the ground supply voltage while transistor $Q_1$ is ON, thereby discharging the true data node $N_T$, and consequently turning PMOS transistors $Q_5$ ON and NMOS transistor $Q_3$ OFF, so that the complementary data node $N_C$ is charged to the high logic-level voltage through transistor $Q_5$. Then transistor $Q_1$ is turned OFF latching the true data node $N_T$ low and the complementary data node $N_C$ high. Similarly, to write a logic one into the memory cell M, the bit line $B_L$ is connected to the positive supply voltage +V while transistor $Q_1$ is ON, thereby charging the true data node $N_T$ to the high logic-level voltage, and consequently turning PMOS transistor $Q_5$ OFF and NMOS transistor $Q_3$ ON, so that the complementary data node $N_C$ is held at the low logic-level voltage through transistor $Q_3$. Then, transistor $Q_1$ is turned OFF latching the true data node high and the complementary data node low. As is known in the art, transistor $Q_1$ is made larger than transistors $Q_2$ and $Q_4$, thereby allowing the true data node $N_T$ to be driven to the desired logic-level voltage from the bit line $B_L$ through transistor $Q_1$ against the will of whichever transistor $Q_2$ or $Q_4$ that happens to be ON.

An alternative to the CMOS type SRAM memory cell disclosed in the Cavaliere patent, is an NMOS resistive-load SRAM memory cell, an example of which is disclosed in FIG. 2 of U.S. Pat. No. 4,297,721 by McKenny et al. Such resistive-load type SRAM memory cell uses only four NMOS transistors and two polysilicon load resistors. Since, as noted above, the memory cells used in the subarrays of the inventive device do not need to be read, and can be written into by accessing only one data node, a three-transistor modified version of the resistive-load type SRAM memory cell can be employed in the subarrays of the inventive device 110.

It will be appreciated that other types of memory cells could be used in the subarrays of the inventive device. For example, a conventional dynamic RAM (DRAM) type memory cell or a conventional Flash erasable programmable ROM (EPROM) type memory cell could be employed. The term "Flash" refers to the ability to rapidly erase the memory with electrical pulses. Thus, such memory types are also referred to as "electrically erasable" or EEPROM devices. However, each of these different types of memory devices would present their own design challenges to implement.

For example, a DRAM memory cell, as the term "dynamic" implies, requires periodic refresh cycles to maintain its storage of a high logic-level voltage, and it only has one data node with limited driving power. Flash EPROM memory cells require programming voltages exceeding the standard supply voltages available on a chip, which generally requires integration of a change pump on the chip. Also, it is typical of Flash EPROM memories that either the entire memory or a block portion of the memory is erased in one step. An example of a basic single-transistor, single capacitor DRAM memory cell is disclosed in U.S. Pat. No. 3,387,286 by Dennard. An example of a Flash EPROM memory cell is disclosed in U.S. Pat. No. 4,958,321 by Chang. In view of the foregoing design challenges, the presently preferred type of memory cell for the subarrays of the inventive device 110 is an SRAM memory cell, such as depicted in FIG. 11 herein.

The relevant portions of the disclosures of U.S. Pat. Nos. 3,879,621; 4,297,721; 3,387,286; and 4,958,321 are incorporated herein by reference. Although preferred embodiments of the invention have been described in detail, it will be understood that various changes and substitutions can be made therein without departing from the spirit and scope of the invention as set forth in the appended claims.

What is claimed is:

1. A sensor device comprising:
   a substrate;
   a composite interconnect structure disposed on the substrate, the structure including layers of conductive and insulating material, the structure having an upper layer of insulating material that defines a sensing surface;
   circuit elements having regions within the substrate;
   conductive interconnects in the composite interconnect structure for interconnecting the circuit elements; and
   an array of pixels for sensing an object finger, in close proximity to the sensing surface;
   wherein each pixel includes a subarray of upper capacitor plates embedded in insulating material of the composite interconnect structure at a level just beneath the sensing surface, first and second lower capacitor plates disposed at a level beneath the upper capacitor plates, a memory cell corresponding to each upper capacitor plate for selectively connecting its respective upper capacitor plate to either the first or the second lower capacitor plate, and a sensor circuit connected to the first and second lower capacitor plates for generating an output signal at a predetermined time in a controlled sequence of events, whereby the output signal is a function of the capacitance sensed at the portion of the sensing surface corresponding to the pixel.

2. The sensor device of claim 1 further comprising first and second transistor switches driven by each memory cell, the first transistor switch being connected between the respective upper capacitor plate and the first lower capacitor plate, the second transistor switch being connected between the respective upper capacitor plate and the second lower capacitor plate, wherein the memory cell stores either a logic zero or a logic one, such that when storing a logic one the memory cell drives the first transistor switch ON and the second transistor switch OFF, and when storing a logic zero the memory cell drives the second transistor switch ON and the first transistor switch OFF.

3. The sensor device of claim 2 wherein the sensor circuit includes an amplifier having its input connected to one lower capacitor plate and its output connected to the other lower capacitor plate.

4. The sensor device of claim 2 wherein each subarray has three or more rows and three or more columns, the number of rows being equal to the number of columns.

5. The sensor device of claim 2 wherein the memory cells each consist of an SRAM memory cell.

6. The sensor device of claim 1 wherein each subarray has a two-dimensional layout of upper capacitor plates arranged in rows and columns in which the number of upper capacitor plates per row and per column are equal.

7. A sensor device formed on an IC chip for sensing human fingerprints having fingerprint-bearing skin, comprising:
   a sensing surface;
   a two-dimensional array of pixels arranged in X rows and Y columns, the pixels each having capacitor plates beneath the sensing surface for sensing the proximity of a user's fingerprint-bearing skin thereover;
   a supply and logic unit for supplying power and signals for controlling and timing various device operations, which include scanning the rows and columns sequentially to address each pixel to cause each pixel to generate an output signal that is a function of the proximity of the fingerprint-bearing skin to the sensing surface at that pixel; and
   output logic circuitry in communication with the pixel array for generating digital data signals representing the values of the pixel output signals;
   wherein each pixel includes a subarray of capacitor plates that are configured during device operations to provide different patterns of plate interconnections in successive sensing operations.

8. The sensor device of claim 7 wherein each pixel subarray has its capacitor plates arranged in a two-dimensional layout of rows and columns of equal number, the capacitor plates being imbedded in a dielectric layer at an upper level of the device just beneath the sensing surface, each pixel having first and second lower-level capacitor plates arranged beneath the subarray of upper-level capacitor plates, each pixel having switch circuitry that selectively connects some of the upper-level capacitor plates to the first lower-level capacitor plate and the remaining upper-level capacitor plates to the second lower-level capacitor plate.

9. The sensor device of claim 8 wherein the switch circuitry includes a memory cell corresponding to each upper-level capacitor plate, wherein each memory cell can exist in a logic state in which either a logic one or a logic zero is stored, each memory cell driving a pair of transistors so that one transistor of the pair is ON and the other is OFF, one transistor of the pair when ON connecting the corresponding upper-level capacitor plate to the first lower-level capacitor plate, and the other transistor of the pair when ON connecting the corresponding upper-level capacitor plate to the second lower-level capacitor plate.

10. The sensor device of claim 9 further comprising a sensor circuit corresponding to each pixel connected to the first and second lower-level capacitor plates, the sensor circuit receiving a row select signal for selectively applying a reference voltage pulse to the pixel for generating its output signal and receiving a column select signal for selectively communicating its output signal to the output logic circuitry.

11. The sensor device of claim 10 wherein the sensor circuit of each pixel further comprises an amplifier connected across the first and second lower-level capacitor plates, and a reset transistor connected in parallel with the amplifier for controllably holding the amplifier at its logical threshold voltage until the pixel is about to be addressed by the scanning signals generated under the timing and control of the supply and logic unit.

12. The sensor device of claim 11 wherein each memory cell consists of an SRAM memory cell.

13. The sensor device of claim 12 wherein the memory cells have their logic states changed by selectively sequentially addressing all memory cells of corresponding rows of the subarrays of each row of the pixel array using word lines running parallel to the rows, and by communicating a logic zero or logic one selectively sequentially to the addressed memory cells of corresponding columns of the subarrays for all columns of the pixel array simultaneously using bit lines running parallel to the columns, whereby the identical subarray capacitor plate configuration can be stored in the memory cells of each pixel.

14. A method of operating a fingerprint sensor device having an array of pixels, each pixel having a subarray of upper capacitor plates beneath a sensing surface of the device, and first and second lower capacitor plates beneath the upper capacitor plates, comprising:

identifying a first subarray pattern having a first set of upper capacitor plates and a second set of upper capacitor plates, each plate being included in either one of the first or second sets;

connecting the upper capacitor plates of the first set of each pixel subarray to the corresponding first lower capacitor plate;

connecting the upper capacitor plates of the second set of each pixel subarray to the corresponding second lower capacitor plate;

sequentially sensing a first reading of the capacitance values at each pixel of the array while the fingerprint-bearing skin of a user's finger is applied to the sensing surface;

storing data corresponding to the then sensed capacitance values for the first subarray pattern;

identifying a second subarray pattern having a third set of upper capacitor plates and a fourth set of upper capacitor plates, each plate being included in either one of the third or fourth sets, wherein the second subarray pattern differs from the first subarray pattern;

connecting the upper capacitor plates of the third set of each pixel subarray to the corresponding first lower capacitor plate;

connecting the upper capacitor plates of the fourth set of each pixel subarray to the corresponding second lower capacitor plate;

sequentially sensing a second reading of the capacitance values at each pixel of the array while the fingerprint-bearing skin of a user's finger is still applied to the sensing surface;

storing data corresponding to the then sensed capacitance values for the second subarray pattern; and combining the data for the first subarray pattern with that of the second subarray pattern for each pixel to produce data representing more accurate capacitance measurements for the entire array compared to a single sensing operation, enabling the capturing of a more accurate fingerprint representation.

15. The method of claim 14 further comprising at least one additional sequence of identifying, connecting, sensing, and storing steps using at least one additional different subarray pattern and including the data therefrom in the combining step.

16. The method of claim 15 wherein the subarray patterns are randomly generated.

17. The method of claim 15 wherein the subarray patterns are predetermined patterns.

18. The method of claim 17 wherein the upper capacitor plates of each subarray are arranged in three rows and three columns, and wherein each subsequent subarray pattern differs from the immediately preceding subarray pattern in that the connections between no more than two upper capacitor plates and the lower capacitor plates are changed.

19. The method of claim 17 wherein the upper capacitor plates of each subarray are arranged in four rows and four columns, and wherein each subsequent subarray pattern differs from the immediately preceding subarray pattern in that the connections between no more than four upper capacitor plates and the lower capacitor plates are changed.

20. The method of claim 17 wherein the upper capacitor plates of each subarray are arranged in five rows and five columns, and wherein each subsequent subarray pattern differs from the immediately preceding subarray pattern in that the connections between no more than eight upper capacitor plates and the lower capacitor plates are changed.

* * * * *